United States Patent Office 2,716,058
Patented Aug. 23, 1955

2,716,058

DERESINATION OF WOOD PULP

William Howard Rapson and Morris Wayman, Hawkesbury, Ontario, Canada, assignors to Canadian International Paper Company, Montreal, Quebec, Canada, a corporation of the Province of Quebec No Drawing. Application June 24, 1950,
Serial No. 170,262

6 Claims. (Cl. 92—13)

This invention relates to the manufacture of purified wood cellulose, and particularly to the manufacture of wood cellulose of very low resin content.

In the manufacture of wood cellulose of the highest grades, especially cellulose to be used for the manufacture of viscose rayon, cellophane, plastics, cellulose derivatives such as nitrocellulose, cellulose acetate, etc., and other cellulosic products, wood is debarked and chipped, and the wood chips are treated at elevated temperatures and pressures with a chemical solution. The chemical solutions which have found most use in industry up to now are either solutions of bisulphites, usually of calcium, magnesium or ammonium and containing also an excess of free sulphur dioxide in solution, or solutions of sodium hydroxide, sodium sulphide, sodium carbonate or combinations of these. At the conclusion of this treatment the softened chips are disintegrated into wood pulp. Such wood pulp contains small but significant proportions of lignin, tannins and other coloring matter, and organic solvent-extractable materials such as fats, fatty acids, resin acids, sterols and hydrocarbons. These solvent-extractable substances are sometimes collectively called "resin," and this class of material will be so referred to herein.

The wood pulp produced as described above is then subjected to a bleaching treatment. In the art as hitherto practiced it has been customary to employ a caustic extraction stage, in which the wood pulp, generally after treatment in an aqueous suspension with chlorine or a hypochlorite such as sodium or calcium hypochlorite, is treated with a dilute solution of sodium hydroxide, usually at elevated temperatures. At this stage most of the residual lignin passes into solution as sodium salts of the chlorinated or oxidized lignin products. In addition, some of the resin will pass into solution, either as sodium salts of the free acids present as part of the resin, or as saponification products of the fats and other saponifiable materials, or as an emulsion of unsaponifiable material. These dissolved and emulsified materials are removed when the pulp is drained and washed at the end of the caustic extraction stage. Within certain limits the proportion of resin removed is dependent upon the proportion of sodium hydroxide present, having regard to the other caustic-consuming materials which are also present, in the sense that the more caustic soda used for a given pulp, the lower is the resin content of the extracted pulp. However, this relationship ceases to hold when there is an excess of caustic soda present, for then an increase in proportion of caustic soda has only a very slight influence, if any, on the proportion of resin yet remaining in the pulp.

The level of resin content of a wood pulp obtained by a process including such a stage depends on a number of factors including the kind of wood from which the pulp is made, the duration of seasoning of the wood, the purity of the water employed in the process, the degree of chlorination preceding the caustic extraction, and also on other factors which are not yet fully understood. It is well-known, however, that the level of resin content reached by such a simple treatment would not usually be low enough for the best quality of wood cellulose, especially when the wood from which the pulp is made is relatively freshly cut and unseasoned, or is a hardwood such as birch or poplar. Such pulps usually contain 1 per cent or more of resin after the caustic extraction stage. A relatively high resin content has created such difficulties in the processing of hardwood pulps into viscose rayon, or other cellulose derivatives, that the use of such woods has been inhibited.

It is an object of this invention to provide a process for removing resin from wood pulp.

It is a further object of this invention to provide a process for removing resin from wood pulp made from freshly cut and unseasoned wood.

It is a further object of this invention to provide a process for removing resin from wood pulp made from birch, poplar and other hardwoods.

Other objects of the invention will become apparent from the detailed description and the appended claims which follow.

We have discovered that the resin content of wood pulps can be greatly reduced by the addition of certain chemicals, which we shall call "deresination agents," to the caustic extraction stage. While the chemicals disclosed herein benefit all types of pulp when used as described below, they are especially beneficial when used with hardwood pulps, or pulps made from unseasoned wood.

The resin content of wood pulp may be determined by successive extractions of a weighed pulp sample with ether and ethyl alcohol (as, for example, in TAPPI standard method T 204 m 46). We have, however, found it advantageous to determine resin by means of a single extraction for 3½ hours in a Soxhlet extractor with the constant boiling mixture of methyl-alcohol and benzene. The residue remaining upon evaporation of the solvent is the resin.

Certain variations may be resorted to in carrying out our invention. In one embodiment, for instance, the caustic extraction stage including the deresination agent can be carried out directly on unbleached pulp. The conditions for the caustic extraction stage are subject to great variability and may be governed by factors not related directly to this process, for example the level of alpha cellulose desired in the pulp. An illustrative range of conditions is 0.1 to 1% deresination agent and 2 to 12% caustic soda on pulp at 6 to 22% consistency at 60 to 100° C. for one-half to four hours' time of treatment. Pressure extraction at temperatures above 100° C. may also be used. Resin removal is very rapid and generally takes place largely in the first few minutes of the treatment.

At the conclusion of this treatment the pulp is thoroughly washed. It may then be subjected to further bleaching or purification treatments if desired before being sheeted and dried, or otherwise prepared for sale or further use.

In another embodiment of our invention, the pulp is treated before the caustic extraction stage with chlorine or with a hypochlorite such as sodium or calcium hypochlorite. In certain cases such pretreatment appears to assist the removal of the resin in the caustic extraction stage although use of a deresination agent is still required to reduce the resin content to the desired value. Such a pretreatment may be carried out on an aqueous suspension of the pulp at a low consistency, say 2 to 6% and at ordinary temperatures for about one hour. Since this stage proceeds rapidly at the prevailing water temperature, better mixing and easier handling result from the use of such low consistencies, but the use of higher consistencies has also given good results. The time required depends on the nature of the wood from which the pulp is made, and on the water temperature, but we have found one hour to be sufficient in most cases, and this process has been used successfully with a twenty minute treatment time. Actually, our studies of the rate of absorption of active chlorine by a sulphite softwood pulp under these conditions indicated that 84% of the chlorine to be absorbed was absorbed in three minutes and 90% in ten minutes at 20° C., and the same proportions at 0° C., although the total absorption at 0° C. was about 10% less. Thus the bulk of the reaction is completed in ten minutes. The amount of chlorine or hypochlorite used depends also on the kind of wood pulp treated, and on the degree of cooking, and must be determined in each case beforehand, the best amount to use in each case being that which will give a small residual of unused chlorine or hypochlorite at the end of the treatment. Normally cooked sulphite pulps require on the order of 1 to 4% chlorine on pulp, or the corresponding amount of hypochlorite calculated as active chlorine.

We have discovered also that a further improvement in the deresination of wood pulps can be obtained by combining the principles of this invention with the principles of the invention disclosed in copending U. S. application Serial No. 170,261, filed June 24, 1950, now abandoned, which discloses the use of chlorine dioxide in a stage preceding the caustic extraction stage as a means to somewhat lower the resin content of wood pulp. In that application there is described a process for deresination of wood pulp by treating the pulp with a solution of chlorine dioxide under conditions similar to those described in the preceding paragraph for treatment of the pulp with chlorine followed by extraction with a dilute caustic soda solution at elevated temperatures. The lowest commercially possible resin values may be obtained by combining the principles of the invention disclosed in the aforesaid pending application with the disclosure of the instant invention, although it should be distinctly understood that the process of the present invention itself can produce perfectly satisfactory commercial results. It follows that a preferred process for reducing the resin content of wood pulp to a minimum consists of treating the pulp at low density and ordinary temperatures (without the addition of externally applied heat) with chlorine dioxide followed by a caustic extraction stage including one or more of the deresination agents discussed below. Such a process has produced commercially acceptable resin values in the most refractory samples of wood pulp which have come to our attention, including those made from very green woods, and sulphite pulps from hardwoods such as birch, oak and poplar. This process makes possible the use of such pulps for the best quality wood cellulose, which up to now has been impossible. The implications of this in terms of economy in the use of forest resources, the production of cellulose sheets with special properties, etc., will be obvious to those familiar with modern cellulose production.

The class of deresination agents which we have found to accomplish the objects of this invention consists of the condensation products of ethylene oxide with various organic substances including phenols containing an aliphatic side chain, aliphatic alcohols, aliphatic acids, cycloaliphatic acids and natural products such as rosin, tall oil, cashew nut shell oil and products derived from such natural products, for example, by hydrogenation. Examples of deresination agents falling in the above class which we have found especially useful include ethylene oxide condensation products with octyl phenol, nonyl phenol, dioctyl phenol, lauryl alcohol, tall oil, cashew nut shell oil, rosin and hydrogenated rosin as represented by the commercially available mixture of di- and tetrahydroabietic acids. The per cent of ethylene oxide condensed in the compound varies, of course, with the rest of the molecule. As an example, the best result with a rosin condensate was obtained with 69.8 per cent ethylene oxide. Higher proportions of the ethylene oxide content up to 80% were almost as good, and lower proportions to 63.7% were also almost as good, although still lower proportions of ethylene oxide had less effect, probably because of altered solubility characteristics. With cashew nut shell oil condensed with ethylene oxide, the optimum ethylene oxide content was 57.5%, more ethylene oxide up to 70% was almost as good, while lower amounts, 51% and below, were definitely inferior. Here again the solubility characteristics changed in about this region. With tall oil the best result was obtained when the condensate contained 61% ethylene oxide, higher proportions up to 77.7% being still satisfactory, lower proportions less so. Our conclusion is that solubility has an important effect, and that optimal results are obtained with the amount of ethylene oxide required to solubilize the compound in water, that more ethylene oxide does not improve the compound as a deresination agent, and in fact may cause a small decrease in value, while less ethylene oxide gives definitely poorer results.

We shall now give some examples to illustrate our invention.

*Example I.*—A batch of sulphite wood pulp made from a commercial mixture of woods containing 80% hardwoods, mainly birch and maple, and 20% softwoods, mainly spruce, was treated in aqueous suspension at 3% consistency with 3.5% chlorine on pulp for 1 hour at 20° C. The chlorinated pulp was then washed and extracted at 15% consistency for 3 hours at 95° C. with a solution containing 4.0% caustic soda on pulp and 1% on pulp of nonyl phenol condensed with ethylene oxide and containing 64.1% ethylene oxide. The resulting pulp contained 0.12% resin.

When another sample of the same pulp was treated in exactly the same way, except that the deresination agent was omitted, the resulting pulp contained 0.61% resin.

This resin-lowering effect cannot be achieved with ordinary washing or detergent or emulsifying agents. The specific effect of the deresination agent was shown by repeating the experiment on other samples of the same pulp, using the same proportion of sodium pyrophosphate in one case and a good soap, sodium oleate, in another case in place of the deresination agent. The resulting pulps were very little better than the control with no deresination agent, having 0.55% and 0.45% of resin, respectively, thus being considerably above commercially acceptable values.

*Example II.*—Another sample of the same unbleached pulp as in Example I was extracted with a solution containing 2% caustic soda on pulp, and containing also 1% of the same nonyl phenol condensed with ethylene oxide, the other conditions of the treatment being the same as in Example I. At the end of the treatment the pulp was chlorinated to demand and given a further caustic extraction, but without any deresination agent present. The resulting pulp contained 0.15% resin. Thus it is shown that the resin content can be brought down to low value by the use of a deresination agent in a caustic extraction before any chlorination or other bleaching.

*Example III.*—Another sample of the same pulp as in Example I was treated with chlorine dioxide to demand (0.6% chlorine dioxide on pulp) at 3% consistency at 20° C. for 1 hour. The pulp was then washed and given the same caustic extraction as in the first paragraph of Example I, using the same deresination agent. The resulting pulp contained only 0.08% resin.

When this process was repeated using common detergents and soaps in place of the deresination agent, the results were uniformly unfavorable. Thus a common good grade of soap, sodium oleate, gave a resin content of 0.53%; a synthetic soap, an alkyl aryl sulphonate, gave 0.37% resin; a good emulsifying and wetting out agent made from coconut oil fatty acids condensed with diethylene triamine gave 0.39% resin.

*Example IV.*—Another sample of the same pulp as in Example I was treated with chlorine dioxide as in Example III, washed and extracted with caustic soda as in Example III, except that in place of the nonyl phenol condensate with ethylene oxide, a condensate prepared from cashew nut shell oil and ethylene oxide containing 57.5% ethylene oxide was used, and only 0.5% on pulp of this deresination agent was used. The resulting pulp contained only 0.15% resin after the caustic extraction.

*Example V.*—The same as Example IV except that the deresination agent employed was 0.5% on a pulp of rosin condensed with ethylene oxide containing 69.8% of ethylene oxide. The pulp after the caustic extraction contained 0.16% resin.

*Example VI.*—The same as Example IV except that the deresination agent employed was 0.5% on pulp of tall oil condensed with ethylene oxide and containing 61% of ethylene oxide. The pulp after the caustic extraction contained 0.22% resin.

*Example VII.*—A sample of unbleached sulphite pulp prepared from freshly cut yellow birch wood was treated with 1.1% chlorine dioxide under conditions similar to those of Example III, washed and subjected to a caustic extraction similar to that in the first paragraph of Example I, using the same deresination agent. The resulting pulp contained 0.08 per cent resin. Another sample of this pulp processed in exactly the same way, except that the deresination agent was omitted from the caustic extraction stage, contained 1.05% resin.

Thus it will be seen that the present invention discloses a novel method for removing resin from wood pulp which includes adding to said pulp at the caustic extraction stage a deresination agent of the class including the condensation products of ethylene oxide with phenols containing an aliphatic side chain, aliphatic alcohols, aliphatic acids, cycloaliphatic acids, rosin, tall oil, cashew nut shell oil and the hydrogenated products of rosin, tall oil and cashew nut shell oil, whereby to remove a substantial part of the resin content of the pulp during the caustic extraction stage; and further discloses a modified process in which the pulp is first treated with chlorine dioxide to further enhance the resin removal; and which results in a pulp of extremely low resin content capable of withstanding bleaching treatments following the resin removal treatments to produce a finished pulp suitable for conversion into cellulose derivatives of the highest quality.

We claim:

1. In a method of removing resin from wood pulp prepared from hardwood, the steps of incorporating in an aqueous suspension of wood pulp from 0.1 to 1.0 per cent, based on pulp of a deresination agent selected from the group consisting of the condensation products of ethylene oxide with one of the following, octyl phenol, nonyl phenol, dioctyl phenol, lauryl alcohol, tall oil, cashew nut shell oil, rosin and hydrogenated rosin as represented by a mixture of di- and tetra-hydroabietic acids, the ethylene oxide portion of said deresination agent constituting from about 50 to about 80 per cent of the weight thereof and treating said pulp in suspension for from ½ to 4 hours with from 2.0 to 12.0 per cent of sodium hydroxide, based on pulp, at from about 60° C. to about 100° C.

2. In a method of removing resin from wood pulp prepared from hardwood the steps of incorporating in an aqueous suspension of wood pulp from 0.1 to 1.0 per cent, based on pulp, of a deresination agent consisting of the condensation products of ethylene oxide with nonyl phenol in which the ethylene oxide portion of said deresination agent constitutes from about 50 to about 80 per cent of the weight thereof, and treating said pulp in suspension for from ½ to 4 hours with from 2 to 12 per cent of sodium hydroxide, based on pulp at from about 60° C. to about 100° C.

3. The method of claim 2 in which the deresination agent consists of the condensation products of ethylene oxide with octyl phenol.

4. The method of claim 2 in which the deresination agent consists of the condensation products of ethylene oxide with tall oil.

5. The method of claim 2 in which the deresination agent consists of the condensation products of ethylene oxide with cashew nut shell oil.

6. The method of claim 2 in which the deresination agent consists of the condensation products of ethylene oxide with rosin.

References Cited in the file of this patent

UNITED STATES PATENTS

| Number | Name | Date |
|---|---|---|
| 864,565 | Rogers | Aug. 27, 1907 |
| 1,633,927 | Davidson | June 28, 1927 |
| 1,741,540 | Richter | Dec. 31, 1929 |
| 1,930,853 | Kollek et al. | Oct. 17, 1933 |
| 1,970,578 | Schoeller et al. | Aug. 21, 1934 |
| 2,074,473 | Jayme | Mar. 23, 1937 |
| 2,144,756 | Fritz | Jan. 24, 1939 |
| 2,178,831 | Bruson | Nov. 7, 1939 |
| 2,390,212 | Fritz | Dec. 4, 1945 |
| 2,407,909 | Vincent et al. | Sept. 17, 1946 |
| 2,421,291 | Schmutzler | May 27, 1947 |
| 2,423,469 | Schlosser et al. | July 8, 1947 |
| 2,481,278 | Ballard et al. | Sept. 6, 1949 |
| 2,520,733 | Morris et al. | Aug. 29, 1950 |
| 2,522,447 | Harris | Sept. 12, 1950 |
| 2,596,092 | Benneville | May 13, 1952 |
| 2,687,352 | Hoos | Aug. 24, 1954 |

OTHER REFERENCES

Cellulose and Cellulose Derivatives by Ott, published by Interscience Publishers, Inc., New York (1943), page 274.